United States Patent [19]

Camacho

[11] Patent Number: 5,143,000
[45] Date of Patent: Sep. 1, 1992

[54] REFUSE CONVERTING APPARATUS USING A PLASMA TORCH

[75] Inventor: Salvador L. Camacho, Raleigh, N.C.

[73] Assignee: Plasma Energy Corporation, Raleigh, N.C.

[21] Appl. No.: 698,914

[22] Filed: May 13, 1991

[51] Int. Cl.[5] .................... F23G 5/00; F23G 5/10
[52] U.S. Cl. .................. 110/250; 48/197 R; 48/DIG. 2; 110/229; 110/259
[58] Field of Search ............ 110/250, 256, 346, 229, 110/259, 165 R; 48/197 R, DIG. 2

[56] References Cited

U.S. PATENT DOCUMENTS

| | | | |
|---|---|---|---|
| 3,422,206 | 1/1969 | Baker et al. | 13/34 |
| 3,643,610 | 2/1972 | Bycroft | 110/8 C |
| 3,779,182 | 12/1973 | Camacho | 110/8 R |
| 3,812,620 | 5/1974 | Titus et al. | 48/65 |
| 4,181,504 | 1/1980 | Camacho | 48/197 R |
| 4,697,532 | 10/1987 | Furukawa et al. | 110/346 |
| 4,718,362 | 1/1988 | Santen et al. | 110/229 X |
| 4,770,109 | 9/1988 | Schlienger | 110/250 X |
| 4,787,320 | 11/1988 | Raaness et al. | 110/250 |
| 4,831,944 | 5/1989 | Durand et al. | 110/229 X |
| 4,989,522 | 2/1991 | Cline et al. | 110/250 |
| 4,998,456 | 3/1991 | Dighe et al. | 110/256 X |

FOREIGN PATENT DOCUMENTS 0080613  7/1981  Japan ................. 110/250

Primary Examiner—Edward G. Favors
Attorney, Agent, or Firm—Bell, Seltzer, Park & Gibson

[57] ABSTRACT

Mixed refuse containing organic and inorganic material forms a column-like mass within a furnace chamber. The column of material is heated by a plasma torch having a forward plasma-emitting end disposed within the lower portion of the column and surrounded by the refuse therein. The height of the stack is maintained at a preselected elevation above the forward end of the torch. Gases produced by pyrolytic conversion of organic components of the refuse are discharged through ports of the chamber. Melted metallic and other inorganic refuse forms a pool upon a hearth of the furnace chamber. The plasma torch imparts circulatory movement to the pool. An injector downstream from the torch directs steam onto material adjacent the surface of the pool. Excess molten material is drained from the pool and the furnace chamber.

12 Claims, 1 Drawing Sheet

REFUSE CONVERTING APPARATUS USING A PLASMA TORCH

FIELD OF THE INVENTION

This invention relates to apparatuses wherein mixed refuse is heated by a plasma torch for the purpose of converting its organic components into fuel gases, and its inorganic components into inert solid matter.

BACKGROUND OF THE INVENTION

The apparatus of Applicant's prior U.S. Pat. No. 3,779,182 includes a furnace chamber containing mixed refuse that is heated by plasma torches. The plasma torches are disposed above a hearth of the furnace chamber, and above the mass of refuse extending upwardly from such hearth. This results in part of the heat generated by the torches not being utilized to its maximum extent, since the heat ascends to the top of the chamber without passing through any of the refuse within the lower part of the furnace chamber.

SUMMARY OF THE INVENTION

The apparatus of the present invention is similar to that disclosed in U.S. Pat. No. 3,779,182, but differs therefrom by, among other things, its more efficient utilization of the heat and other energy generated in the furnace chamber by a plasma torch. The plasma torch has its output end, i.e., the end from which the stream of heated plasma is discharged, located within the lower portion of the column-like mass of refuse within the furnace, in relatively distal underlying relationship to the top of such mass. Heat emanating from the plasma stream of the torch and then ascending into the upper part of the furnace therefore passes through and preheats the refuse within the overlying portion of the mass. This more efficient utilization of the heat generated during operation of the apparatus significantly reduces operating costs and/or reduces the time required for conversion of organic components of the refuse into fuel gases, and for converting inorganic components into molten material which forms a pool upon the hearth of the furnace chamber. In addition to this more efficient utilization of the heat energy of the torch, the kinetic energy of the plasma stream may be and preferably is used to impart desired circulatory movement to the molten material within the pool upon the hearth of the furnace chamber. The circulatory movement of the pool transports material within and upon its surface past a location where the material is injected with steam which assists in pyrolytic conversion of the material.

The apparatus preferably includes conveyor and control means for automatically maintaining the top of the refuse column at an elevation well above the plasma torch.

The apparatus also includes outlets for discharging fuel and/or other gases from the furnace chamber, and for discharging molten material from the pool thereof upon the furnace hearth when the quantity of such material would otherwise become excessive.

DESCRIPTION OF THE PRIOR ART

In addition to the previously noted U.S. Pat. No. 3,779,182, the following U.S. Patents may also be of interest relative to the present invention: U.S. Pat. Nos. 3,422,206, 3,643,610, 3,812,620, 4,181,504, 4,697,532 and 4,787,320.

DESCRIPTION OF THE DRAWINGS

Other features of the invention will be apparent from the following description of an illustrative embodiment thereof, which should be read in conjunction with the accompanying drawings, in which.

DESCRIPTION OF THE ILLUSTRATED EMBODIMENT

Figure 1:
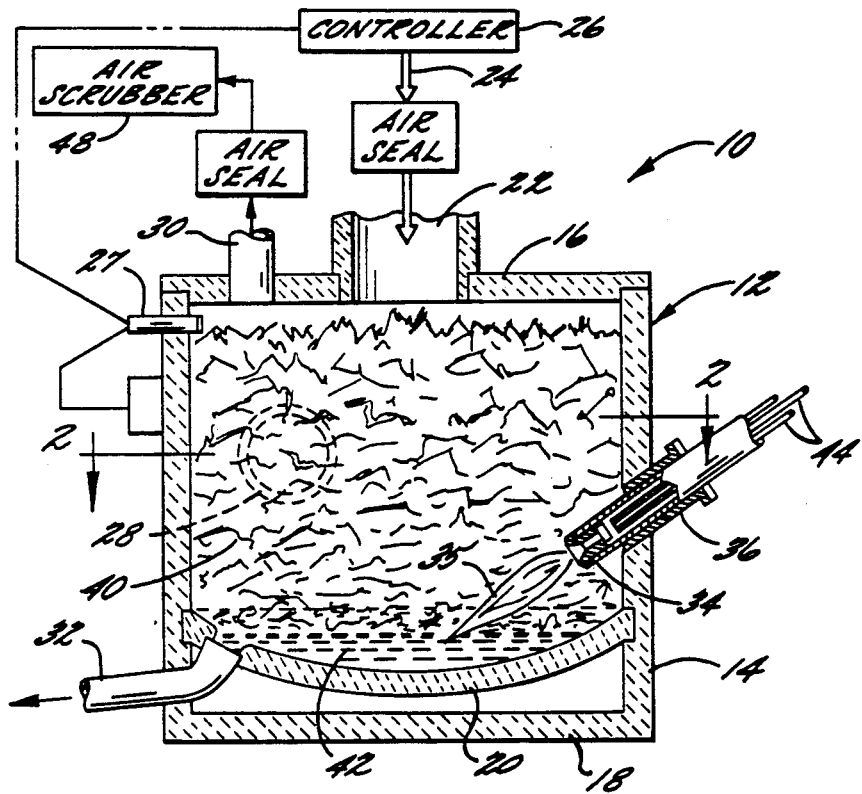
FIG. 1 is a partially schematic view, primarily in vertical section, but with some components being shown in elevation, of a furnace chamber and other components of an apparatus in accordance with the invention.

The apparatus 10 shown in FIG. 1 includes an upstanding cylindrical furnace chamber 12 formed of suitable refractory material. Furnace 12 includes an outer wall 14, top wall 16 and a bottom wall 18. Furnace 12 also includes a concave hearth 20 that overlies and is adjacent to bottom wall 18.

Heterogenous or "mixed" refuse, containing both organic and inorganic material, is introduced into furnace 12 through an inlet 22 within and centrally of its top wall 16. The refuse is conducted to inlet 22 by a conveyor 24. The operation of conveyor 24 is controlled by a controller 26 that receives input signals from a level sensor 27 adjacent the furnace's top wall 16. Gas discharge ports 28, 30, with which suitable suction fans and/or other flow control devices (not shown) are associated, are respectively located in the outer wall and in the top wall of furnace 12 Additionally, a molten material overflow outlet 32 extends from hearth 20 through outer furnace wall 14. Refuse inlet 22, gas outlets 28, 30 and overflow drain 32 are all provided with suitable sealing means, as shown schematically in FIG. 1, that block introduction of air into furnace 12.

Figure 2:
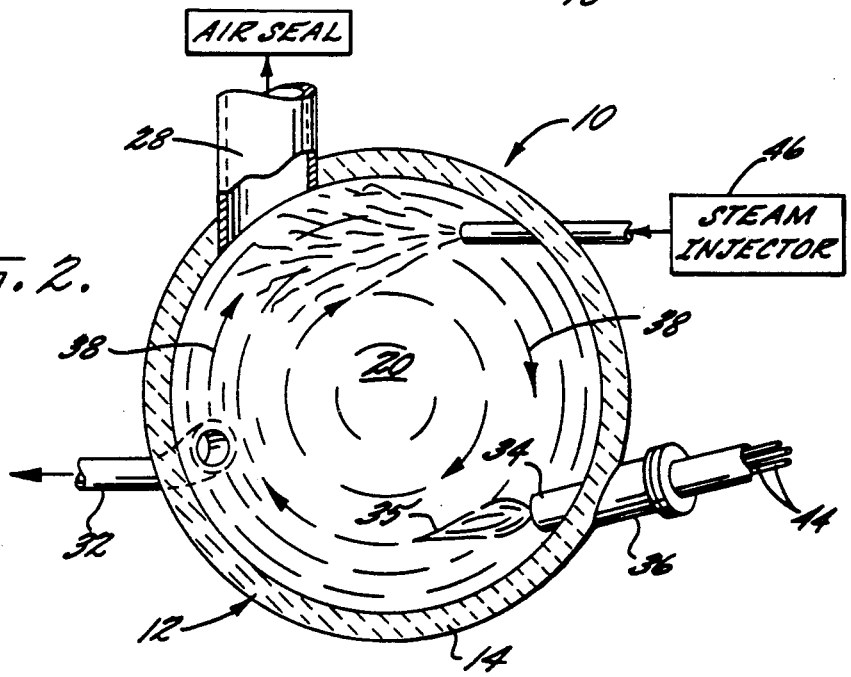
FIG. 2 is a sectional view taken in the direction of the arrows and along the line 2—2 of FIG. 1 through the furnace chamber of the apparatus.

A plasma torch 34 extends angularly through a sleeve 36 within cylindrical wall 14 of furnace 12. Sleeve 36 permits axial adjustment of the position of torch 34 and includes sealing means (not shown) that blocks introduction of air through the sleeve into chamber 12. Torch 34 may be of either the transfer or non-transfer art type. In either case, the torch receives electrical power and gases from lines 44 connected to the end thereof disposed outside of chamber 12. As is best shown in FIG. 2 of the drawings, the stream 35 of plasma passing axially during operation of torch 34 from its discharge (left, as viewed in FIG. 2) end is spaced radially outwardly from the vertical axis of hearth 20 and extends substantially tangentially of an imaginary cylinder (not shown) concentric with such axis and having a diameter at least approximately one-half of the hearth diameter. At a location displaced approximately 180° in the direction of the arrows 38 from plasma stream 35, steam is injected during operation of apparatus 10 into furnace chamber 12 by a steam injector 46 connected to a suitable steam source (not shown).

The mixed refuse introduced into furnace chamber 12 via inlet 22 forms a column 40 that extends upwardly from hearth 20 to a preselected elevation adjacent top wall 16 of furnace 12 Sensor 27, controller 26 and conveyor 24 effect introduction of additional refuse into furnace 12 when and as needed to maintain the top of column 40 at or near the preselected elevation. The discharge end of plasma torch 34 and the plasma stream 35 projecting from it are buried within and surrounded by the refuse within the lower part of column 40. As the heat produced by torch 34 ascends upwardly from hearth 20, it therefore passes through and preheats the overlying refuse within column 40. The refuse within that part of column 40 adjacent the elevation of lower gas outlet 28 is heated to a temperature, illustratively approximately 1,000° C., sufficient to effect pyrolytic conversion of the organic components of such refuse into valuable fuel gases. Such gases are conducted from chamber 12 via gas outlet 28 to a suitable collection site or vessel (not shown).

The temperature maintained by plasma torch 34 within that part of refuse column 40 adjacent hearth 20 is at least approximately 2,000° C. Such temperature effects melting of metallic and other inorganic components of the refuse. These molten components form a pool 42 within the concave upper part of hearth 20. The kinetic energy of the plasma stream 35 of torch 34 imparts circulatory movement to pool 42 in the direction of the arrows 38 (FIG. 2). The lighter, non-metallic components of the inorganic refuse float within and/or upon the upper part of pool 42, and therefore are subjected to very intense heat as circulatory movement of the pool carries them to and forwardly from the location at which the plasma stream 35 engages the pool. Shortly after passing through the aforesaid high temperature region, the refuse floating upon the pool is injected with steam by injector 46, which further assists in converting any fixed carbon within such material to gases. Such gases are withdrawn through lower gas outlet 28, along with the gases previously discussed. Gases emanating from the upper, less hot refuse within the upper part of chamber 12, are usually undesirable ones, and are conducted from the furnace through upper gas outlet 30 to a suitable scrubber or other environmentally-acceptable disposal means 48.

Although only a single plasma torch 34 and steam injector 46 are shown in the drawings, a plurality of torches and/or injectors may be provided.

While a specific embodiment of the invention has been shown and described, this was for purposes of illustration only, and not for purposes of limitation, the scope of the invention being in accordance with the following claims.

I claim:

1. Apparatus for converting refuse, comprising:
   an upstanding furnace chamber;
   a hearth within and adjacent the bottom of said chamber;
   refuse inlet means adjacent an upper portion of said chamber, refuse entering said chamber via said inlet means defining a column extending upwardly from said hearth;
   an elongate plasma torch having a forward end from which a stream of hot plasma is emitted during operating of said torch;
   said end of said torch being disposed within said chamber closely adjacent the bottom of said mass of said refuse, whereby heat generated by said torch passes through and along substantially the entire height of said column, and
   first and second gas outlets communicating with said furnace chamber at first and second different elevations therein for conducting gases produced by heating of said refuse from said chamber.

2. Apparatus as in claim 1, wherein said means for introducing said refuse into said chamber includes control means for maintaining the top of said column of said refuse at an elevation above said end portion of said plasma torch.

3. Apparatus as in claim 1, and further including mounting means mounting said plasma torch for axial movement to an operating position wherein said end portion of said torch is closely adjacent said hearth and said bottom of said column of said refuse, and for permitting retraction of said torch from said chamber when desired.

4. Apparatus as in claim 1, wherein said torch extends angularly upwardly from said end thereof within said refuse, and has an opposite end disposed externally of said furnace chamber.

5. Apparatus as in claim 1 wherein said hearth has a concave upper surface containing, during operation of said apparatus, a pool of molten material; and said torch imparts circulatory movement to said pool.

6. Apparatus as in claim 5, and further including means for injecting steam into said furnace chamber at a location adjacent the surface of said pool.

7. Apparatus as in claim 6, wherein said location at which said steam is ejected into said furnace chamber is downstream, in relation to the direction of said circulatory movement of said pool, from said torch.

8. Apparatus as in claim 7, and further including drain means for draining excess molten material from said pool and said chamber.

9. Apparatus as in claim 1 further comprising sealing means associated with said refuse inlet means and said first and second gas outlets for blocking the introduction of air into said furnace chamber.

10. Refuse converting apparatus, comprising:
    an upstanding furnace chamber;
    a hearth within and adjacent the bottom of said chamber, said hearth being adapted during operation of said apparatus to receive a pool of molten metallic and other inorganic material;
    refuse inlet means adjacent an upper portion of said chamber, refuse entering said chamber via said inlet means defining a column extending upwardly from said hearth and from said pool therein;
    an elongate plasma torch having a forward end from which a stream of plasma is emitted during operation of said torch;
    said end of said torch being disposed within said chamber closely adjacent the bottom of said mass of said refuse and closely adjacent said pool upon said hearth, heat generated by said torch passing through and along substantially the entire height of said column, said torch imparting circulatory movement to said pool during operation of said apparatus;
    a steam injector for injecting steam into said chamber adjacent said pool at a location downstream from said torch;
    gas discharge ports located at first and second different elevations within said furnace chamber for conducting from said chamber gases produced by conversion of organic components of said refuse; and
    drain means for draining molten material from said pool and from said furnace chamber.

11. Apparatus for converting refuse, comprising:

an upstanding furnace chamber;
a hearth within and adjacent the bottom of said chamber, with said hearth having a concave upper surface containing, during operation of said apparatus, a pool of molten material;
refuse inlet means adjacent an upper portion of said chamber, refuse entering said chamber via said inlet means defining a column extending upwardly from said hearth;
an elongate plasma torch having a forward end from which a stream of hot plasma is emitted during operating of said torch;
said end of said torch being disposed within said chamber closely adjacent the bottom of said mass of said refuse and so as to impart circulatory movement to said pool of molten material in said hearth, and whereby heat generated by said torch passes through and along substantially the entire height of said column, and
means for injecting steam into said furnace chamber at a location adjacent the surface of said pool.

12. Apparatus as in claim 11, and further including drain means for draining excess molten material from said pool and said chamber.

* * * * *

UNITED STATES PATENT AND TRADEMARK OFFICE
CERTIFICATE OF CORRECTION

PATENT NO. : 5,143,000
DATED : September 1, 1992
INVENTOR(S) : Salvador L. Camacho It is certified that error appears in the above-identified patent and that said Letters Patent is hereby corrected as shown below:

On the title page, under "References Cited," item (56):

U.S. Patent "4,998,456" should be -- 4,998,486 --.

Column 2, line 36, after "12" insert a period -- . --.

Column 2, line 68, after "12" insert a period -- . --.

Column 3, line 61, "operating" should be -- operation --.

Column 5, line 12, "operating" should be -- operation --.

Signed and Sealed this

Seventh Day of September, 1993

Attest:

BRUCE LEHMAN

Attesting Officer

Commissioner of Patents and Trademarks